United States Patent

Puhk

[15] 3,678,097
[45] July 18, 1972

[54] SOLUBLE ALKALI METAL SALT REMOVAL FROM SUBSTANTIALLY NON-POLAR LIQUIDS

[72] Inventor: Heino Puhk, North Olmsted, Ohio
[73] Assignee: SCM Corporation, Cleveland, Ohio
[22] Filed: Nov. 25, 1970
[21] Appl. No.: 92,842

Related U.S. Application Data

[63] Continuation-in-part of Ser. No. 709,214, Feb. 29, 1968, abandoned.

[52] U.S. Cl. .................260/486 R, 260/410.6, 260/410.7, 260/406 B
[51] Int. Cl. .....................................C07c 69/54
[58] Field of Search ...........................260/486 R, 486 B

[56] References Cited

UNITED STATES PATENTS 3,174,995  3/1965  Cour.........................260/486
3,314,988  4/1967  Nemec et al...................260/486

Primary Examiner—Lorraine A. Weinberger
Assistant Examiner—Paul J. Killos
Attorney—Harold M. Baum, Merton H. Douthitt, Howard G. Bruss, Russell L. Brewer and James E. Carson

[57] ABSTRACT

A process for removing soluble alkali metals from substantially non-polar organic liquid esters is described. The process comprises adding a hydroxy-substituted lower aliphatic saturated dicarboxylic acid to substantially non-polar liquid esters containing alkali metals in salt form, particularly lithium salts, in solution. The hydroxy-substituted saturated dicarboxylic acids form solid insoluble crystalline alkali metal salts in such liquids permitting the separation of the alkali metal moieties from the medium by conventional methods. The presence of dissolved alkali metal salts is undesirable in that it interferes with the end use of such liquid esters.

6 Claims, No Drawings

SOLUBLE ALKALI METAL SALT REMOVAL FROM SUBSTANTIALLY NON-POLAR LIQUIDS

This application is a Continuation-in-Part of pending U.S. patent application, Ser. No. 709,214, filed in the U.S. Pat. Office Feb. 29, 1968, now abandoned, in the name of Heino Puhk and assigned to the assignee as the instant application.

The closest prior art known to applicant is in the file of the above-mentioned patent application.

The invention relates to the removal of alkali metals, particularly lithium, from non-polar organic liquid esters and more particularly to a process in which such esters having alkali metal salts dissolved therein are precipitated by the addition of a hydroxy-substituted lower aliphatic saturated dicarboxylic acid.

The invention is advantageous in that it facilitates the almost quantitative removal of alkali metals, particularly lithium, from organic esters, particularly hydroxy-substituted esters of ethylenically unsaturated monocarboxylic acids. The presence of soluble alkali metal salts in such esters in undesirable since such salts often interfere with the end use of the liquids.

The present invention provides a process for removing soluble alkali metals from the above-described esters which comprises the steps of a. adding to a medium consisting essentially of a hydroxy alkyl ester of an ethylenically unsaturated monocarboxylic acid which contains minute amounts of lithium salts dissolved therein a hydroxy-substituted lower aliphatic saturated dicarboxylic acid in an amount sufficient to form a solid lithium salt of said dicarboxylic acid in said medium and b. separating said salt from said medium.

Alkali metals in the form of salts occur widely in solution in small amounts in substantially non-polar organic liquid esters due to the methods by which such liquids are obtained. By way of example, when liquid organic esters are formed by reacting an alcohol or an alkylene oxide with a carboxylic acid, an alkali metal salt is employed to catalyze the esterification reaction. The presence of alkali metal residues in the finished ester is disadvantageous in that certain esters decompose or are otherwise altered by time due to the presence of such alkali metals.

The present invention is based on the discovery that when a hydroxy-substituted saturated lower aliphatic dicarboxylic acid is added to a liquid medium having one or more alkali metal salts dissolved therein, the hydroxy-substituted dicarboxylic acid preferentially reacts with the soluble alkali metal salt to form an insoluble alkali metal salt by virtue of its reaction. The resulting precipitated solids can be readily removed by conventional methods such as filtration, decantation, centrifugation, and the like.

Alkali metal salts such as sodium, potassium, and lithium are usually only slightly soluble in such organic liquid esters but are often present in amounts up to 1,000 parts per million Li. and in such concentrations usually interfere with the stability of the liquid organic ester or with its end use. The addition of the hydroxy-substituted dicarboxylic acid usually reduces the concentration of such alkali metal salts to as low as 10 parts per million or less in the liquid organic ester medium.

A wide variety of hydroxy-substituted lower aliphatic saturated dicarboxylic acids can be employed in the processes of this invention. Examples of a hydroxy-substituted saturated lower aliphatic dicarboxylic acids include monohydroxy dicarboxylic acids such as tartronic (hydroxymalonic), malic (hydroxy succinic acids); dihydroxy dicarboxylic acids such as tartaric (dihydroxy succinic acid; polyhydroxy dicarboxylic acids, including trihydroxy glutaric and saccharic (tetrahydroxy adipic acid and the like). Of these, monohydroxy dicarboxylic acids are preferred for economic reasons and because it has been found to form crystalline precipitates which can be readily filtered to remove alkali metals almost quantitatively from liquid organic esters as herein described.

One advantageous embodiment of a process of this invention comprises the removal of alkali metals from esters in which alkaline metal salts have been used to catalyze the reaction between an acid and a lower alkylene oxide. Where such esters comprise the reaction product of an $\alpha,\beta$-ethylenically unsaturated carboxylic acid and a lower alkylene oxide, the presence of the alkali metal tends to promote the formation of undesirable byproducts including products such as homopolymers of the ester monomer. Also, the presence of alkali metals in the liquid organic esters often interferes with the properties of products such as polyester polymers which are prepared by using the ester as one monomeric component of the polymer system.

By way of example, alkali metal salts such as sodium, potassium, and lithium, chlorides, carbonates, acrylates, methacrylates, and the like are often used as catalysts in the reaction between an ethylenically unsaturated monocarboxylic acid and a lower alkylene oxide, and an alkali metal salt is always present in the resultant liquid ester. In one embodiment of a process falling within the scope of the invention the removal of an alkali metal salt is accomplished by adding one of the hereinbefore described hydroxy-substituted saturated aliphatic dicarboxylic acids to the liquid organic ester immediately after its preparation.

The preparation of liquid organic esters with which the present invention is concerned is usually accomplished by reacting a polyol or a lower alkylene glycol with an $\alpha,\beta$-ethylenically unsaturated monocarboxylic acid. Examples of such unsaturated monocarboxylic acids include acrylic, methacrylic, crotonic, isocrotonic, vinylacetic, tiglic, angelic, senecioic, teracrylic, hypogeic, oleic, elaidic, erucic, brassidic, behenic, etc., acids.

Examples of polyhydroxy alcohols and lower alkylene oxides which may be reacted with the aforementioned monocarboxylic acids include, for example, glycerine, ethylene glycol, propylene glycol, butylene glycol, etc., and ethylene, propylene, and butylene oxides.

When reacted with $\alpha,\beta$-ethylenically unsaturated monocarboxylic acids these materials form hydroxy-substituted alkyl esters of such acids and the reaction is usually catalyzed by an organic amine or an alkali metal salt. The lower alkylene oxide, when employed, can be reacted with any of the above acids and the reaction is usually carried out in the presence of a conventional inhibitor such as quinone antioxident or a hydroquinone or derivative thereof, preferably hydroquinone mono methylether (sometimes referred to as MEHQ) and a catalyst which is usually a potassium or a lithium salt. The reaction is often, although not necessarily, conducted in a hydrocarbon solvent such as xylene or toluene. The resultant product is an ester of a mixture of ester with the solvent containing the ester and small amounts of the inhibitor and alkali metal salt hereinbefore described.

The addition of one of the aforementioned hydroxy-substituted saturated lower aliphatic dicarboxylic acids to the liquid ester precipitates the alkali metal by virtue of the formation of a solid crystalline carboxylic acid salt of the alkali metal. Surprisingly, when an unsubstituted saturated dicarboxylic acid such as, for example, oxalic acid, is added to such liquid esters, an amorphous dispersion is formed which can be filtered only with great difficulty.

The amount of hydroxy-substituted dicarboxylic acid which is added to the liquid organic ester medium can vary considerably but will depend to a large extent upon the amount of soluble alkali metal salt in the liquid. Usually a stoichiometric amount of hydroxy-substituted dicarboxylic acid is added in order to quantatively remove the alkali metal without leaving a significant amount of free unreacted hydroxy-substituted dicarboxylic acid in the medium. The amount of alkali metal initially present in the medium can be readily determined by conventional analytical methods, or can be computed by determining the amount of alkali metal salt which precipitated from the liquid organic ester medium as the reaction between the $\alpha,\beta$-ethylenically unsaturated monocarboxylic acid and the lower alkylene oxide approach completion.

In the foregoing embodiments of the process of this invention, less than 10 parts per million of alkali metal usually remain in the liquid organic ester medium after the addition of the hydroxy-substituted saturated lower aliphatic dicarboxylic acid and the separation of the salt alkali metal salt therefrom. If alkali metal salts, particularly lithium salts, are present in the medium in amounts above about 10–25 parts per million parts of ester are not removed by the addition of hydroxy-substituted saturated lower dicarboxylic acid, the liquid esters will sometimes tend to form diesters and in some instances homopolymers. Furthermore, as the liquid esters containing alkali metal salts in such higher amounts are used as one monomeric component of a mixture of monomers in the synthesis of polyester polymers and the polyester polymers are cured to produce films, the resultant cured films will not have the moisture- or the weather-resistance desired or expected because the alkali-metal-containing films, when exposed to water, will be attacked due to the leechability of the alkali metal salt residually incorporated in the film. Removal of alkali metal salts from the organic esters stabilizes the monomeric esters and prevents the attack by water of cured films containing them.

It is to be understood that a hydroxy-substituted saturated lower aliphatic monocarboxylic acid can be added to almost any liquid organic ester medium containing an alkali metal to effect the removal of the alkali metal therefrom. Thus, as will be evident hereinafter from the specific examples, alkali metal salts can be removed from such esters at any time wherein they present problems such as, for example, of high ash content, etc.

It is unexpected that a hydroxy-substituted, saturated lower aliphatic dicarboxylic acid would react with an alkali metal or an alkali metal salt to form an insoluble crystalline precipitate and to effect the removal of alkali metal such as lithium from substantially non-polar organic esters in view of the fact that saturated unsubstituted dicarboxylic acids and hydroxy-substituted monocarboxylic acids do not form crystalline precipitates with alkali metals in substantially non-polar liquid organic esters but form amorphous precipitates which are difficult or virtually impossible to remove by filtration.

The following specific examples are intended to illustrate the invention but not to limit the scope thereof, parts and percentages being by weight unless otherwise specified.

EXAMPLE 1

To a reactor equipped with gas introduction and venting means, a thermometer, heating coils, and mechanical agitator, there was added 597 pounds of glacial methacrylic acid. Thereafter there was added to and dissolved in the methacrylic acid 176 grams of hydroquinone methylether (MEHQ). The total hydroquinone inhibitor present in the methacrylic acid was 900 parts per million parts of the methacrylic acid. A nitrogen blanket was introduced into the reactor and slow agitation of the methacrylic acid solution was begun. Thereafter, while agitation was continued, 8,108 grams of lithium carbonate was added and the reactor was vented for one-half hour to permit the escape of carbon dioxide which evolved from the lithium carbonate-glacial methacrylic acid mixture.

After the evolution of the acrbon dioxide was complete, the reactor was sealed and the contents thereof heated to 185° F. with continuing agitation. The contents of the reactor consisted of a mixture of methacrylic acid, lithium methacrylate, and MEHQ. Thereafter, propylene oxide was added over a period of two to six hours until a total of 437 pounds of propylene oxide had been added. During the addition of propylene oxide and a subsequent hold, a period of from six to ten hours, the acid number fell and the reaction mixture was held until a minimum acid number was obtained. The pressure in the reactor was maintained at between 30 and 60 psig and the temperature of the contents of the reactor was maintained at 185° F. During the addition of the propylene oxide and the subsequent holding period, the acid number of the contents of the reactor, which was initially 376, fell to 12.5. Thereafter, the reactor contents were cooled to 90° F., the reactor was vented and a precipitate consisting essentially of liquid methacrylate was removed by filtration. The amount of propylene oxide added was such that a minor molar excess of propylene oxide was present in the reactor during the removal of the lithium methacrylate. The crude filtrate was then charged back into the reactor and heated to 150° F. The filtered material, which consisted essentially of hydroxy propyl methacrylate, contained 1,050 parts per million of lithium as lithium methacrylate. To this organic liquid ester there was added 16.3 pounds of malic acid. The mixture was agitated for one and one-half hours at 150° F after which vacuum was applied to remove excess propylene oxide. The product obtained consisted essentially of hydroxy propyl methacrylate having suspended therein crystals of lithium malate. The crystals were removed by filtration and the final product consisted of 830 pounds of hydroxy propyl methacrylate which had an acid number of 25. The lithium content of the product determined by microanalytical techniques was less than 10 parts per million, expressed as metallic lithium.

EXAMPLE 2

The process of Example 1 was repeated except that 331 pounds of ethylene oxide were used in place of the propylene oxide employed in that example. Upon the removal of lithium malate, water-white liquid hydroxyethyl methacrylate was obtained.

In the foregoing examples, when the malic acid addition step was omitted, the products contained in excess of 1,000 parts of lithium as lithium methacrylate per million parts of ester and were unsuitable for use in the preparation of thermosetting acrylic resins due to poor viscosity control of the resins and to the poor quality of resultant cure films which were tested for water resistance.

EXAMPLE 3

The process of Example 1 was repeated except that tartronic acid was employed in place of the malic acid employed in that example. Substantially the same lithium-free product was obtained.

EXAMPLE 4

The process of Example 1 was repeated except that tartaric acid was employed in place of the malic acid employed in that example. Crystalline lithium tartrate was precipitated and upon removal from the hydroxy propyl methacrylate, a water-white monomeric liquid substantially free of lithium was obtained.

EXAMPLE 5

The procedure of Example 1 was repeated except that acrylic acid was employed in place of the methacrylic acid employed in that example. Upon addition of the malic acid, crystalline lithium malate precipitated from the hydroxy propyl acrylate and was removed by filtration to produce a clear product consisting essentially of monomeric hydroxy propyl acrylate.

EXAMPLE 6

The process of Example 1 was repeated except that ethylene oxide and crotonic acid replaced the propylene oxide and methacrylic acid employed in that example. The resultant product consisted substantially of hydroxy ethyl crotonate which contained prior to the addition of malic acid 1,000 parts per million of lithium. After the addition of lithium malate, the product, which was a water-white liquid, contained less than 10 parts per million of lithium.

EXAMPLE 7

The process of Example 1 was repeated except that crotonic acid was employed in place of the methacrylic acid employed in that example. The resultant product consisted substantially of hydroxy propyl crotonate which contained, prior to the addition of malic acid, 110 parts per million of lithium as lithium crotonate. After the addition of the malic acid and subsequent filtration thereof, the product, which was a water-white liquid, contained no more than 60 parts per million of lithium.

In the foregoing examples, when propionic or butyric acid are added to the ester mixtures, no precipitate occurs. On the other hand, when a dicarboxylic acid, such as oxalic or glutaric acid, is added to the liquid esters, filtration becomes very difficult and/or virtually impossible.

What is claimed is:

1. A process for removing lithium from a liquid medium consisting essentially of a hydroxy alkyl ester of an $\alpha, \beta$-ethylenically unsaturated monocarboxylic acid which contains a small amount of lithium comprises the steps of:
   a. adding to said medium a hydroxy-substituted lower aliphatic saturated dicarboxylic acid in an amount sufficient to form a solid lithium salt of said dicarboxylic acid in said medium and
   b. separating said salt from said medium.

2. The process of claim 1 wherein the hydroxy-substituted lower aliphatic saturated dicarboxylic acid is malic acid.

3. The process of claim 1 wherein the liquid medium is selected from the group consisting of hydroxy alkyl esters of acrylic and methacrylic acid.

4. The process of claim 1 wherein the liquid is selected from the group consisting of hydroxy ethyl and hydroxy propyl esters.

5. The process of claim 1 wherein the liquid is hydroxy propyl methacrylate.

6. The process of claim 5 wherein the hydroxy alkyl ester is hydroxy propyl acrylate.

* * * * *